(12) United States Patent
Tomich

(10) Patent No.: US 11,284,553 B2
(45) Date of Patent: Mar. 29, 2022

(54) AGRICULTURAL IMPLEMENTS AND MEANS FOR ENGAGING THE SAME TO A TRACTOR

(71) Applicant: Agsoilworks Technology Company, LLC, Paso Robles, CA (US)

(72) Inventor: Randal Tomich, Adelaide (AU)

(*) Notice: Subject to any disclaimer, the term of this patent is extended or adjusted under 35 U.S.C. 154(b) by 260 days.

(21) Appl. No.: 16/273,958

(22) Filed: Feb. 12, 2019

(65) Prior Publication Data

US 2019/0246547 A1    Aug. 15, 2019

Related U.S. Application Data

(60) Provisional application No. 62/629,716, filed on Feb. 13, 2018.

(51) Int. Cl.
*A01B 59/06* (2006.01)
*A01B 63/10* (2006.01)

(52) U.S. Cl.
CPC ............ *A01B 59/068* (2013.01); *A01B 63/10* (2013.01)

(58) Field of Classification Search
CPC ............................. A01B 59/068; A01B 63/10
See application file for complete search history.

(56) References Cited

U.S. PATENT DOCUMENTS

| | | | |
|---|---|---|---|
| 184,171 A | 11/1879 | Porter | |
| 774,324 A | 11/1904 | Hill | |
| 2,569,556 A | 10/1951 | Collins et al. | |
| 2,775,176 A * | 12/1956 | Gibson | A01B 63/10 172/460 |
| 2,780,160 A * | 2/1957 | Harris | A01B 59/068 172/248 |
| 3,171,500 A | 3/1965 | Dils | |
| 3,704,753 A | 12/1972 | Hasforth et al. | |
| 4,102,407 A | 7/1978 | Danszky et al. | |
| 4,538,689 A | 3/1985 | Dietrich | |
| 4,519,623 A * | 5/1985 | Orthman | A01B 59/068 172/439 |
| 4,828,041 A | 5/1989 | Cosson | |

(Continued)

FOREIGN PATENT DOCUMENTS

| | | |
|---|---|---|
| AU | 16288/67 B | 7/1968 |
| DE | 2647812 A | 4/1978 |

(Continued)

OTHER PUBLICATIONS

International Search Report relating to application PCT/AU2002/001294, dated Oct. 23, 2002.

(Continued)

*Primary Examiner* — Tara Mayo-Pinnock
(74) *Attorney, Agent, or Firm* — Marcus N. DiBuduo; John R. Aaron

(57) ABSTRACT

An agricultural tractor mounting assembly comprising a toolbar engaged with a first implement engaging a soil subsurface and also equipped with a carrying tool for engaging another implement. The carrying tool may include hydraulic cylinders and hydraulic charged accumulators which lift, suspend, and support implements behind a toolbar engaged to a tractor. The implement engaging the soil and the carrier tool may be engaged to the toolbar of the tractor mounting assembly which is engaged to the tractor.

17 Claims, 16 Drawing Sheets

(56) References Cited

U.S. PATENT DOCUMENTS

| | | | |
|---|---|---|---|
| 5,437,337 A | | 8/1995 | Dietrich |
| 5,499,686 A | | 3/1996 | Parker |
| 5,540,288 A | | 7/1996 | Dietrich |
| 5,601,146 A | * | 2/1997 | Schlegel et al. ..... A01B 59/068 172/439 |
| 5,668,719 A | | 9/1997 | Bobrove et al. |
| 6,178,900 B1 | | 1/2001 | Dietrich |
| 6,443,237 B1 | | 9/2002 | Myers et al. |
| 6,764,270 B1 | * | 7/2004 | Bernhardt et al. ... A01B 51/026 414/685 |
| 8,626,401 B2 | | 1/2014 | Tomich |
| 9,468,139 B2 | * | 10/2016 | Schauerhofer ..... A01B 59/0415 |
| 2003/0036852 A1 | | 2/2003 | Ell et al. |

FOREIGN PATENT DOCUMENTS

| | | | | |
|---|---|---|---|---|
| FR | 1387404 A | * | 1/1965 | ........... A01B 59/043 |
| GB | 787268 A | * | 12/1957 | ........... A01B 59/068 |
| RU | 2102844 C1 | | 1/1998 | |
| SU | 927918 A1 | | 5/1982 | |
| SU | 1011061 A | | 4/1983 | |
| SU | 1653554 A1 | | 6/1991 | |
| WO | 03/024193 A1 | | 3/2003 | |

OTHER PUBLICATIONS

International Preliminary Examination Report relating to application PCT/AU2002/001294, dated Jan. 20, 2004.
Derwent Abstract Accession No. 84-2, SU 1011061 A, Apr. 15, 1983, Marakhovskii P F.
Derwent Abstract Accession No. D9835 K/12, SU 927918, May 15, 1982, Butakov A N.
Derwent Abstract Accession No. 92-140237/17, SU 1653554 A, Jun. 7, 1991, Babitski L F.
Derwent Abstract Accession No. 98-454790/39, RU 2102844 C1, Jan. 27, 1998, UKR Soil Erosion Fighting Inst.
International Search Report and Written Opinion relating to application PCT/AU2008/000137, dated Jun. 4, 2008.

\* cited by examiner

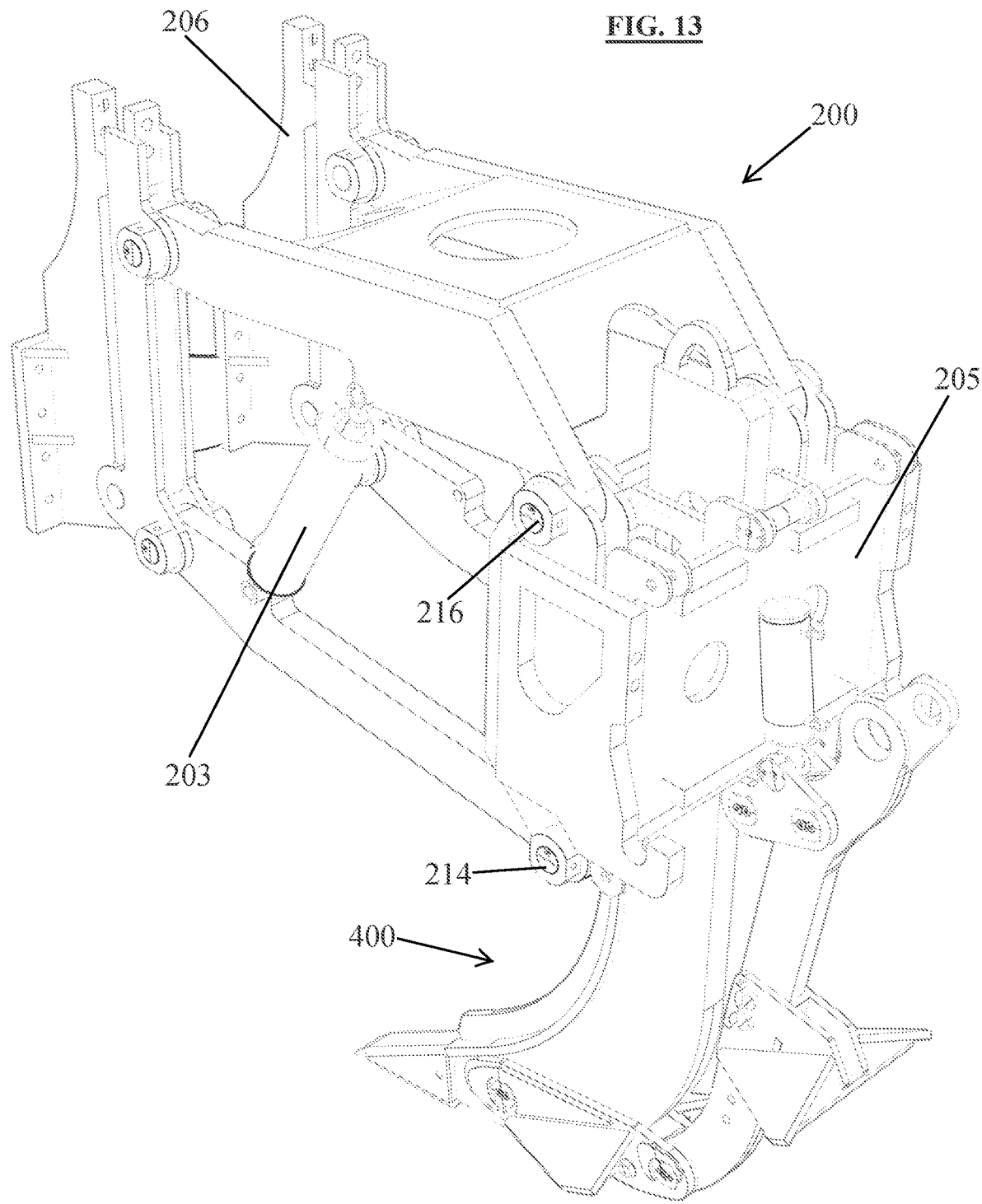

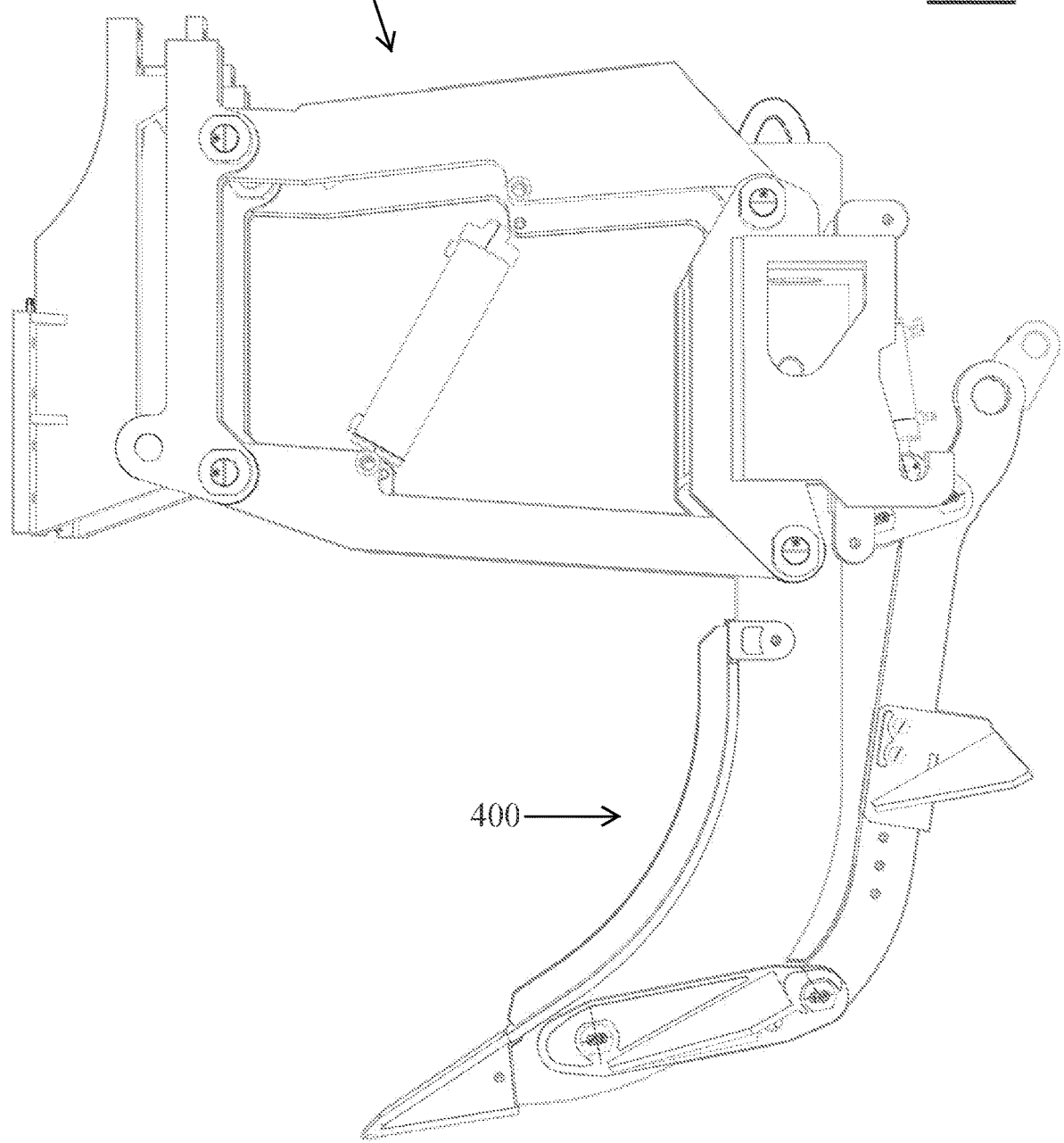

AGRICULTURAL IMPLEMENTS AND MEANS FOR ENGAGING THE SAME TO A TRACTOR

CROSS-REFERENCE TO RELATED APPLICATIONS

The present application claims the benefit of U.S. provisional application No. 62/629,716, filed Feb. 13, 2018, which is incorporated herein by reference in its entirety.

FIELD OF THE INVENTION

The present invention concerns a tractor mounting assembly and an agricultural implement carrying tool for carrying and holding implements. In some aspects, the carrying tool features hydraulic cylinders and hydraulic charged accumulators which lift and suspend implements behind a subsoil tool (or other attachment in operation). The improved carrying tool can attach to the toolbar of an improved tractor mounting assembly. The carrying tool reduces the amount of stress on a toolbar and implement(s) attached thereto by distributing weight to the tractor. Advantageously, the carrying tool also provides for better precision and control of both a tool in operation and an implement engaged with the carrying tool.

In some aspects, the tractor mounting assembly features a hydraulic cylinder on each side of the assembly for controlling the height of the toolbar portion thereof and therefor any implement which is engaged with the toolbar. The mounting assembly is particularly adapted for simultaneously engaging a subsoil tool and a carrying tool, the heights of which can be controlled by the toolbar cylinders.

BACKGROUND OF THE INVENTION

In preparing land and soil for cultivation, multiple types of tools and tractor implements may be used in order to achieve one's desired results. For example, a tractor may be equipped with both surface and subsurface tools, allowing a user to prepare and condition surface soil and subsoil in a single pass. Conventionally, in order to accommodate more than one tool or attachment, a user may utilize both front and rear toolbars of a tractor. Alternatively, or in conjunction with this method, a user may connect multiple tools and/or attachments in series on the rear toolbar of the tractor.

In the latter example above, potential issues and limitations may exist. For example, particularly heavy implements and tools, which are indirectly attached to a toolbar by another implement, can cause stress and strain both on the toolbar and on the tool to which it is connected. As a result, damage could occur to components of the tools, toolbar, and tractor. Additionally, the stress of an indirectly connected tool or implement may affect the performance of the tool that is directly connected to the toolbar. Furthermore, a user may find that the directly connected tool is more difficult to control, thus making it harder to fine tune one's desired results.

Another limitation a user may encounter when implements are connected in series is the inability to independently control each implement. If multiple implements are connected to a single toolbar (directly or indirectly), the positions of each implement are not independently controlled relative to the tractor (and thus soil)—that is, when the position of one implement is changed by the drive cylinders of the mounting assembly, the positions of any other attached implements are changed as well.

It is therefore desirable for a tool, to which additional implements can be attached, that allows a user to independently control attached implements while reducing the amount of strain on other implements attached to a toolbar. The present invention is particularly well suited when one of the implements is a subsoil tool, such as those illustrated in FIGS. 15A-C herein, or are disclosed in U.S. Pat. No. 8,626,401 (the '401 patent), U.S. Provisional Patent Application No. 62/458,444 ("the '444 application"), or U.S. patent application Ser. No. 15/893,486 (the '486 Application), each to the same inventor as the present invention, and each of which are incorporated herein by reference in their entireties. The invention is also well suited for engagement of one or more additional tools or implements, such as rollers as illustrated in FIG. 1 of the '401 patent, to the toolbar via a carrying tool.

As shown in FIG. 1 of the '401 patent, two shanks may be mounted to a frame of a toolbar, which can be towed by a tractor. Improved subsoil tools which may be suitable for use in the present invention are described in the '444 Application and the '486 Application. As shown in FIGS. 2 and 3 of the '486 application, an improved subsoil tool may engage a toolbar frame with two hydraulic cylinders.

BRIEF SUMMARY OF THE INVENTION

The present invention concerns a tool for carrying implements which can be engaged to the toolbar of a tractor, that of which may have an implement equipped for use. Embodiments of the carrying tool may include an assembly frame, one or more side links, one or more hydraulic cylinders, a top frame, a top link, and a linkage frame. The carrying tool can also be engaged to a toolbar of an improved tractor mounting assembly, disclosed herein.

In some embodiments, an assembly frame of the carrying tool can be mounted on and secured to a toolbar, which may further be equipped with a tool such as, but not limited to, a soil ripping tool. In certain embodiments, an assembly frame may have one or more joints to which a top frame, one or more side links, and one or more support extensions may be pivotally engaged. To prevent against frictional wear and damage, one or more guards may be provided at, or adjacent to, a joint. In some embodiments, one or more slots may be provided on an upper lateral edge of an assembly frame to allow for the connection and pivotal movement of a hydraulic cylinder or support rod between a lower portion of an assembly frame and a top frame. The size of a slot may be made in accordance with the desired or maximal pivotal range of a cylinder rod or support rod.

In certain embodiments of the present invention, a side link may have three attachment points for pivotally engaging an assembly frame, hydraulic cylinder, and linkage frame at proximal, medial, and distal portions, respectively (with respect to a toolbar). A side link may be inwardly bent from near a medial portion to near a distal portion thereof. In some embodiments, a side link may have an additional attachment point for pivotally engaging an additional hydraulic cylinder or support rod.

In some embodiments of the present invention, a carrying tool can include one or more hydraulic cylinders. In preferred embodiments, a carrying tool may include a forward set of lift cylinders (i.e., the cylinders closest to a toolbar) and a rear set of suspension cylinders. A lift cylinder may adjust the position of a linkage frame, relative to an assembly frame and toolbar, by the extension and retraction of the lift cylinder rod. A suspension cylinder may be used to maintain the relative positions of a top frame and side link(s). Furthermore, a suspension cylinder may reduce stress on a linkage frame and absorb shock from an attached implement. In a preferred embodiment, one or more suspension cylinders may operate with a hydraulic accumulator. In an alternative embodiment, a support rod (i.e., a solid arm without hydraulic elements) may be substituted for a suspension cylinder.

In other embodiments, a carrying tool may include one or more support extensions, which may be pivotally attached to a joint of an assembly frame. A support extension may also be pivotally engaged with a hydraulic cylinder. For example, and without limitation, a carrying tool may have a pair of support extensions which, at one end, are pivotally attached to joints on each side of an assembly frame. At the other end, the pair of support extensions may each be pivotally engaged with a corresponding hydraulic cylinder, each of which may have a cylinder rod pivotally engaged with a side link. It is to be appreciated, however, that a carrying tool can include any number and combination of hydraulic cylinders, support rods, and support extensions.

Embodiments of the present invention may include a top frame which may be pivotally engaged with an assembly frame, top link, and one or more hydraulic cylinders. In certain embodiments, hydraulic cylinders may engage a side of a top frame at distal and medial portions thereof. A top frame may also be engaged with an assembly frame at a proximal portion thereof. A top link may engage a top frame near a medial portion of a distal edge thereof.

In some embodiments, a top link may be straight and may connect a top frame to a linkage frame at a medial portion thereof. In certain other embodiments, a top link may be integrally formed with a top frame, allowing for a direct connection between a top frame and linkage frame.

The position of a carrying tool may be controlled by one or more hydraulic cylinders associated therewith and by one or more hydraulic cylinders of a toolbar. In some embodiments, the height of a carrying tool can be adjusted by one or more toolbar cylinders, relative to the ground. The position of a linkage frame, relative to an assembly frame (and thus a toolbar) can be adjusted by one or more lift cylinders associated with the carrying tool.

In accordance with some embodiments of the present invention, a carrying tool may engage an agricultural implement to a tractor. An assembly frame of the carrying tool may be adapted to engage the toolbar of a tractor. A carrying tool may include one or more side links on a lateral side of the carrying tool, where an end of a side link may be pivotally engaged with the assembly frame. In certain embodiments, a carrying tool may also include a top frame pivotally engaged with the assembly frame and a top link engaged with the top frame. In some embodiments, a top link may be integrally formed with the top frame. A linkage frame, which may be adapted to engage an agricultural implement, may be pivotally engaged with the top frame and with a side link. One or more hydraulic lift cylinders may be engaged with the assembly frame and with the top frame.

In a preferred embodiment, a carrying tool may have a pair of hydraulic lift cylinders, each of which may be on a lateral side of the carrying tool with a first end engaged with an assembly frame and a second end engaged with a top frame. The carrying tool may further comprise one or more hydraulic suspension cylinders. In preferred embodiments, the carrying tool may include a pair of hydraulic suspension cylinders having a first end engaged with the top frame and a second end engaged with a side link.

In some embodiments of the present invention, a carrying tool may include one or more support rods having a first end, which may be engaged with a top frame, and a second end, which may be engaged with a side link. The carrying tool may further include one or more support extensions which, at a first end, may be engaged to an assembly frame of the carrying tool and which, at a second end, may be engaged with a first end of a hydraulic extension cylinder. At a second end, a hydraulic extension cylinder may be engaged with a side link. In certain embodiments, the carrying tool may include a first support extension and a second support extension which may be unitarily formed.

In certain embodiments, the assembly frame of a carrying tool may include at least one support bracket which may have a shape adapted for engaging with a complementary bracket of a toolbar of a tractor. The linkage frame of a carrying tool may also include at least one bracket having a shape adapted for engaging an agricultural implement. The toolbar of a tractor may also have a shape which may be adapted for engaging an agricultural implement.

In preferred embodiments, a carrying tool may be engaged with an improved tractor mounting assembly. A mounting assembly may include a toolbar, one or more hydraulic toolbar cylinders, and a mounting portion. The toolbar may have attachment points on upper and lower portions thereof to which upper and lower arms of the mounting assembly may be engaged. In a preferred embodiment, a toolbar may be equipped with a ripper assembly (e.g., the ripper assembly disclosed in the '401 Patent or '486 Application, or the ripper assembly shown, for example, in FIGS. 15A-C and 16A-C) by engaging a top portion of thereof (i.e., the shank) through a central opening in the toolbar. In a preferred embodiment, a set of toolbar cylinders may engage upper and lower arms on each side of a mounting assembly. In some embodiments, upper and lower arms on each side of a tractor mounting assembly may form a shape that is, generally, that of a parallelogram. A mounting portion of a mounting assembly may be engaged and secured to a tractor.

In preferred embodiments of the present invention, an improved mounting assembly for a tractor may include a toolbar at a distal end with an opening therein adapted to receive and secure a portion of a subsoil agricultural implement. The mounting assembly may further include a tractor mounting portion at a proximal end for engaging the rear of a tractor. At a lateral top side of the mounting assembly, one or more upper arms may be pivotally engaged at a proximal end with the mounting portion and at a distal end with the toolbar. At a lateral bottom side, one or more lower arms may be pivotally engaged at a proximal end with the mounting portion and at a distal end with the toolbar. One or more hydraulic cylinders may be engaged on a first end to an upper arm and on a second end to a lower arm of the mounting assembly. In certain embodiments, the toolbar, mounting portion, upper arms, and lower arms may be configured to have a general parallelogram shape.

In some embodiments, the toolbar of a mounting assembly may have one or more mounting brackets on a lateral side, which may have an upwardly protruding edge on a lower side of the mounting bracket. In certain other embodiments, a first end of a hydraulic cylinder may be engaged at a proximal end of a lower arm of a mounting assembly and a second end of a hydraulic cylinder may be engaged at a distal end of an upper arm.

As seen in FIG. 2 of the '486 Application, the position of a ripper assembly can be adjusted by two hydraulic cylinders associated with the toolbar. Similarly, the position of the toolbar of the improved mounting assembly, and thus the carrying tool, can be adjusted by one or more toolbar cylinders. The toolbar cylinders of the improved mounting assembly can raise the toolbar, to a height greater than would be allowed by the mounting assembly as shown in the '486 Application, by extending the toolbar cylinder rod. The toolbar of the improved mounting assembly can be lowered by retracting the toolbar cylinder rod.

In accordance with some embodiments of the present invention, a system for ameliorating soil is provided which may include: a tractor; a first agricultural implement, which may comprise a subsoil tool; a second agricultural implement; a mounting assembly which may be engaged to a rear side of the tractor, wherein the mounting assembly may comprise a toolbar which may have an opening therein which may be adapted to receive and secure a portion of the subsoil tool; and a carrying tool which may be engaged to the toolbar of the mounting assembly, wherein the carrying tool may comprise a linkage frame which may have at least one bracket which may have a shape adapted for engaging the second agricultural implement.

In certain embodiments, a mounting assembly may have (i) a mounting portion for engaging to a tractor, (ii) an upper arm which may pivotally engaged with the mounting portion and the toolbar, (iii) a lower arm which may be pivotally engaged with the mounting portion and the toolbar, and (iv) a hydraulic cylinder which may be engaged with the upper arm and a proximal end of the lower arm. In some embodiments, the carrying tool may include (i) an assembly frame for engaging to a toolbar, (ii) a top frame which may be pivotally engaged with the assembly frame and engaged with the linkage frame, (iii) a side link which may be pivotally engaged with the assembly frame and pivotally engaged with the linkage frame, and (iv) a hydraulic lift cylinder which may be engaged with the assembly frame and the top frame. In some implementations, a hydraulic suspension cylinder may be engaged with the assembly frame and the top frame. In other implementations, (i) a support extension may be engaged with the assembly frame, (ii) a support rod may be engaged with the top frame and the side link, and (iii) a hydraulic extension cylinder may be engaged with the side link and the support extension. In some embodiments, the subsoil tool of the soil amelioration system may include (i) a shank, (ii) a wing rod which may be pivotally engaged with the shank, (iii) a hydraulic cylinder which may be engaged with the toolbar, and (iv) a power link which may be engaged with the toolbar, hydraulic cylinder, and wing rod.

BRIEF DESCRIPTION OF THE DRAWINGS

FIG. 13 is a perspective view diagram illustrating an exemplary improved mounting assembly in accordance with some embodiments of the present invention, with the hydraulic cylinders illustrated and also illustrating a ripper assembly inserted into the toolbar.

FIG. 14 is a side view of the mounting assembly illustrated in FIG. 13.

DETAILED DESCRIPTION OF THE INVENTION

The invention, in its various aspects, will be explained in greater detail below. While the invention will be described in conjunction with several exemplary embodiments, the exemplary embodiments themselves do not limit the scope of the invention. Similarly, the exemplary illustrations in the accompanying drawings, where like elements have like numerals, do not limit the scope of the exemplary embodiments and/or invention, including any length, angles or other measurements provided. Rather the invention, as defined by the claims, may cover alternatives, modifications, and/or equivalents of the exemplary embodiments.

Improved Carrying Tool

Figure 1:
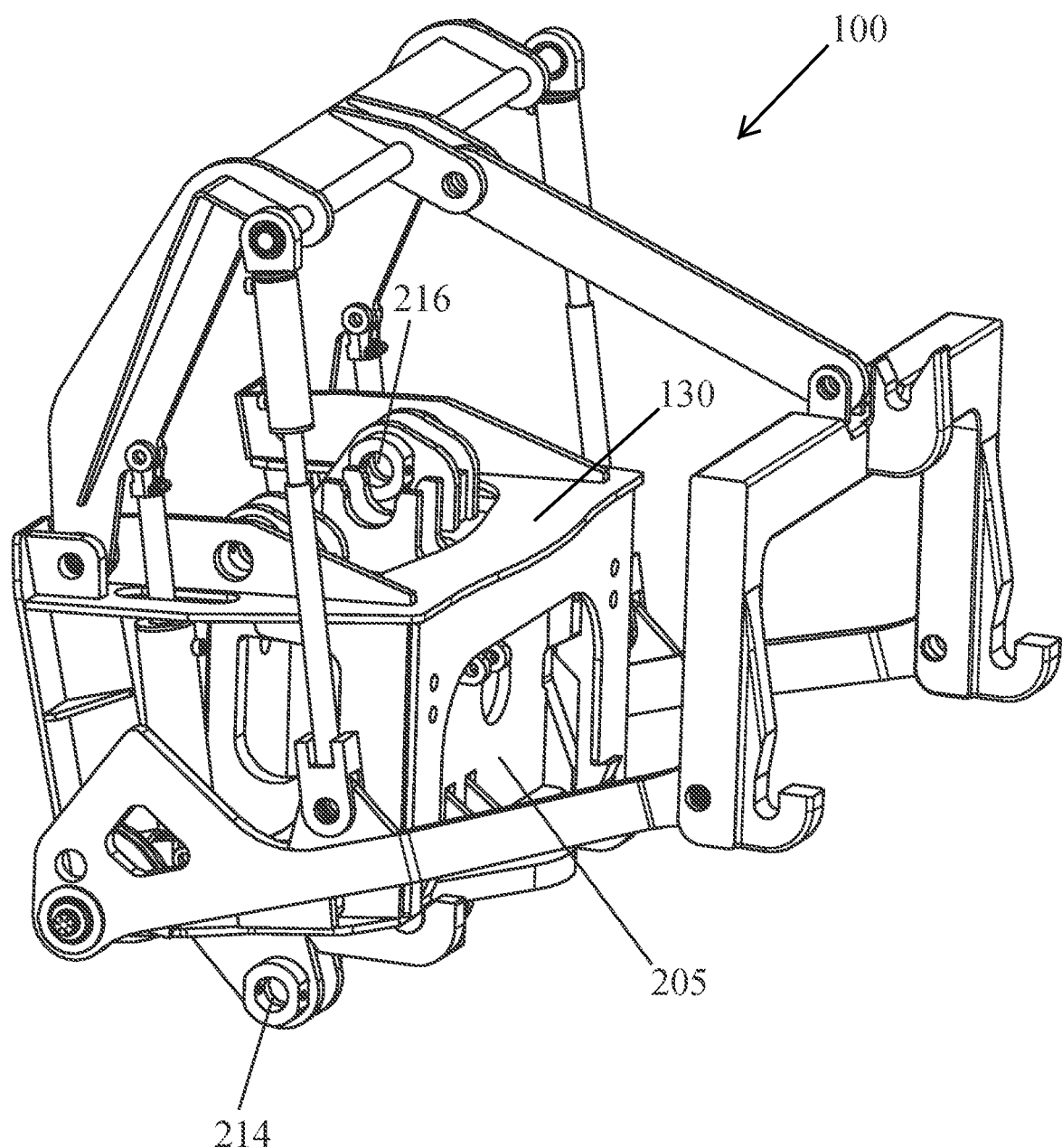
FIG. 1 is a perspective view illustrating an exemplary carrying tool engaged with an exemplary mounting assembly, each of which are in accordance with some embodiments of the present invention.
Figure 2:
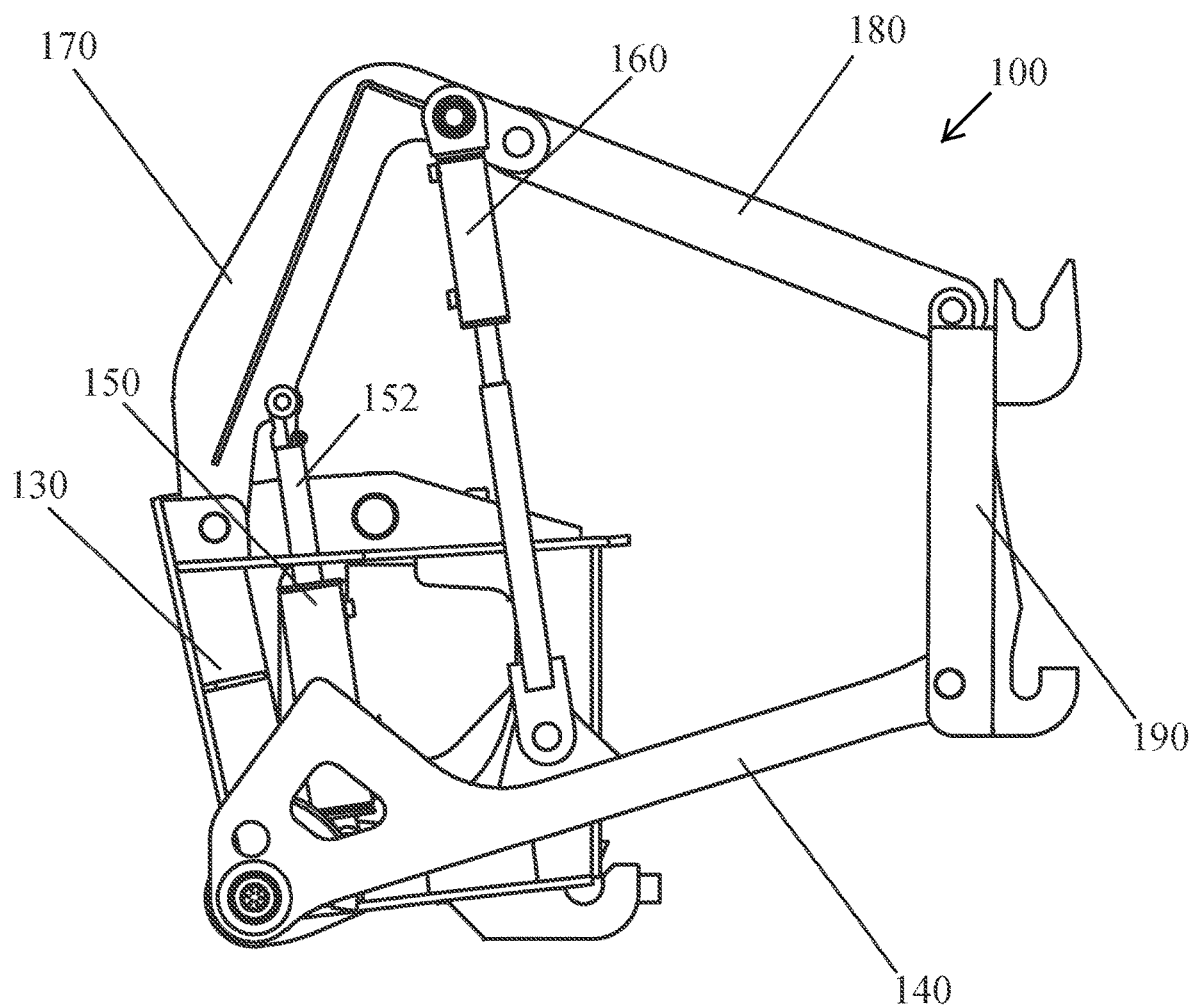
FIG. 2 is a side view of a carrying tool in accordance with some embodiments of the present invention.

Referring to the exemplary illustrations of FIGS. 1 and 2, a carrying tool 100 can include an assembly frame 130, one or more side links 140, top frame 170, top link 180, and linkage frame 190. In some embodiments, carrying tool 100 can be mounted on and attached to a toolbar of a conventional or improved mounting assembly (see, e.g., FIGS. 15A-C and 16A-C). An improved mounting assembly is discussed more fully herein.

Figure 3:
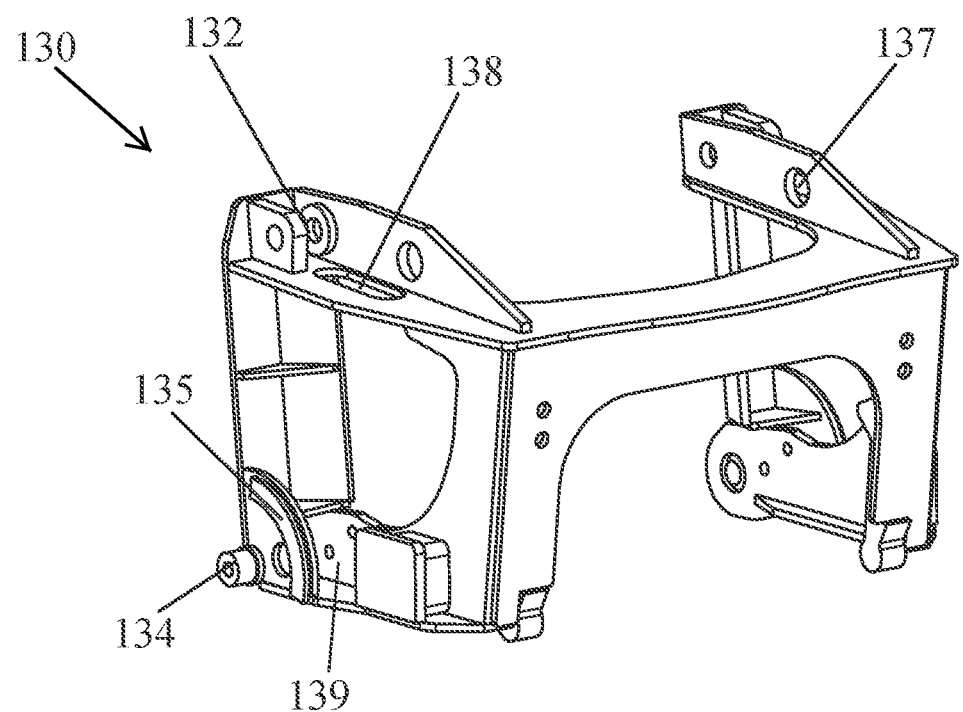
FIG. 3 is a rear perspective view of an exemplary assembly frame of a carrying tool in accordance with some embodiments of the present invention.
Figure 4:
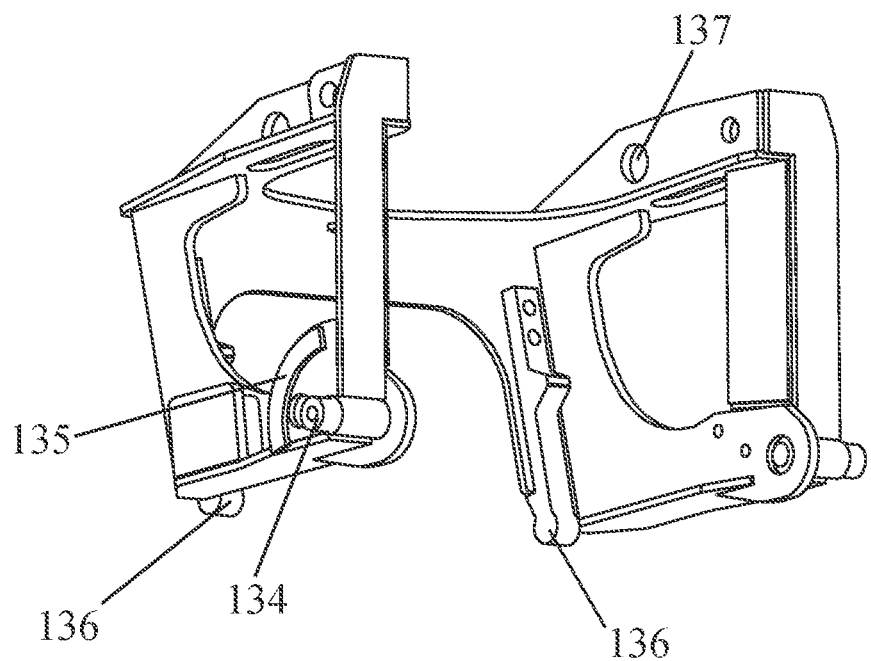
FIG. 4 is a front perspective view of the assembly frame illustrated in FIG. 3.

As best viewed in FIGS. 3 and 4, assembly frame 130 may have one or more upper joints 132 at which top frame 170 may be pivotally engaged. Additionally, one or more lower joints 134 may be located at a lower proximal corner of assembly frame 130, to which one or more side links 140 may be pivotally engaged. In certain embodiments, guard 135 may be provided on a portion of assembly frame 130 near, or adjacent to, a lower joint 134. Guard 135 may shaped in accordance with the pivotal range of side link 140, so that as side link 140 moves through its range of positions during operation, frictional damage is minimized on assembly frame 130 and side link 140.

Figure 11:
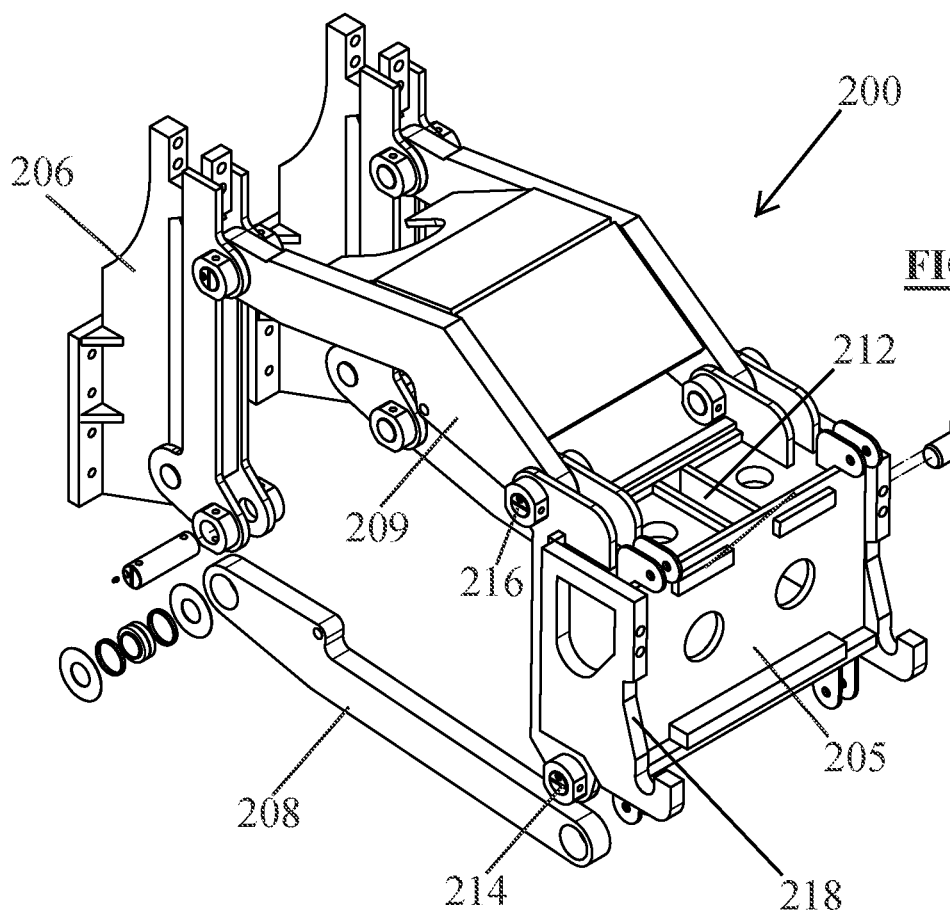
FIG. 11 is a partially exploded perspective view diagram illustrating an exemplary improved mounting assembly in accordance with some embodiments of the present invention, with the hydraulic cylinders not illustrated.
Figure 12:
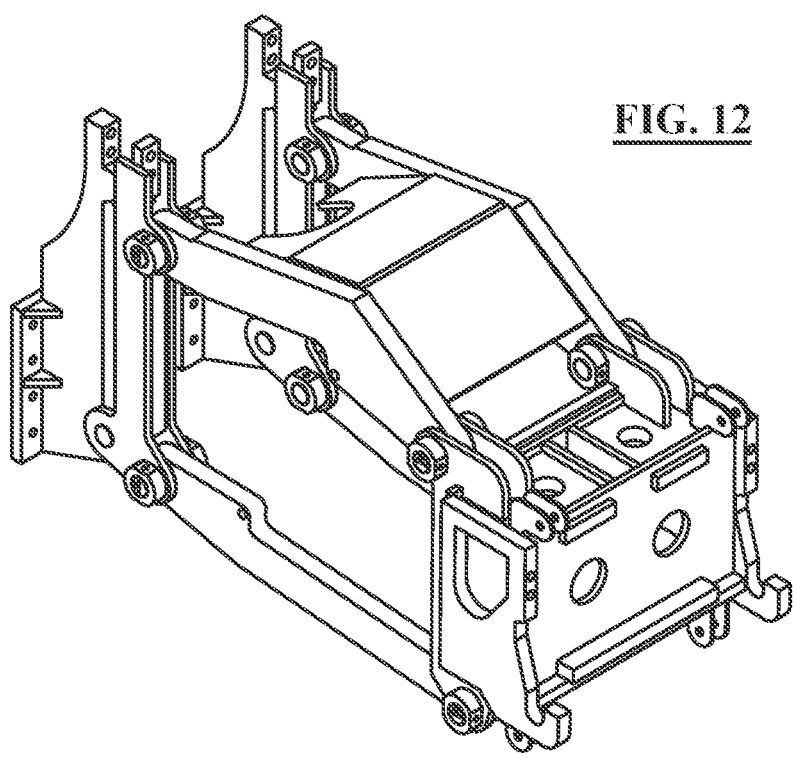
FIG. 12 is a perspective view diagram illustrating the improved mounting assembly of FIG. 11, with the hydraulic cylinders not illustrated.

In some embodiments, assembly frame 130 may include a pair of support brackets 136 which may engage the toolbar of a tractor. In preferred embodiments, support brackets 136 may engage a complementary pair of mounting brackets 218 on toolbar 205 of mounting assembly 200 (as shown in FIG. 11). Mounting brackets 218 of toolbar 205 may include upwardly protruding edges located near the lower side edges thereof for retaining lower protrusions of support brackets 136 of assembly frame 130. In some embodiments, assembly frame 130 may be secured to toolbar 205 by one or more bolts through holes in support brackets 136. In some embodiments, assembly frame 130 may include attachment openings 137, through which bolts may be inserted to secure assembly frame 130 to tractor mounting assembly 200 (or toolbar 205 thereof).

In certain embodiments of the present invention, assembly frame 130 may have one or more slots 138 on an upper lateral edge thereof. Slots 138 may be provided to allow a portion of a hydraulic cylinder connecting top frame 170 and assembly frame 130. As discussed more fully below, assembly frame 130 may have cylinder recesses 139 for insertion of one or more hydraulic cylinders. Slots 138 may also allow for a range of movement by the hydraulic cylinders as it pivots during operation of a carrying tool and may be shaped in accordance with the maximal range of motion of a hydraulic cylinder. It is to be appreciated, however, that a slot 138 may be any shape and may extend along any portion of a lateral edge of assembly frame 130.

Figure 5:
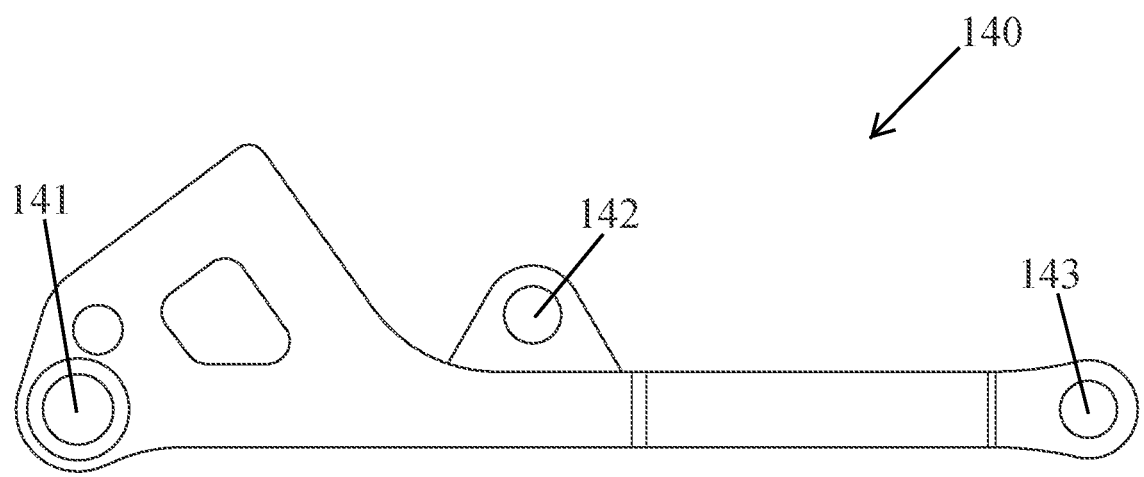
FIG. 5 is a side view of an exemplary side link of a carrying tool in accordance with some embodiments of the present invention.
Figure 6:
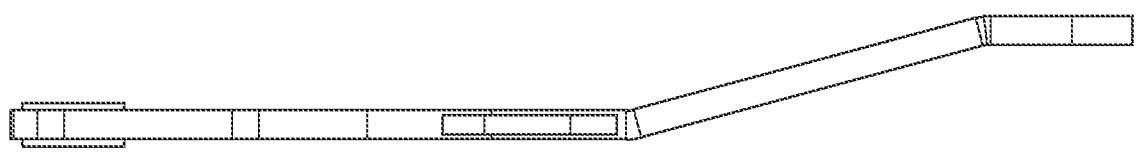
FIG. 6 is a top view of the side link illustrated in FIG. 5.

As best viewed in FIGS. 5 and 6, side link 140 may have three attachment points 141, 142, and 143 by which side link 140 may engage assembly frame 130 at joint 134, a hydraulic cylinder rod, and linkage frame 190, respectively, and secured by one or more bolts or conventional fasteners. In some implementations, side link 140 may be inwardly bent from a point near a medial portion thereof to a point near a distal portion thereof.

Figure 7:
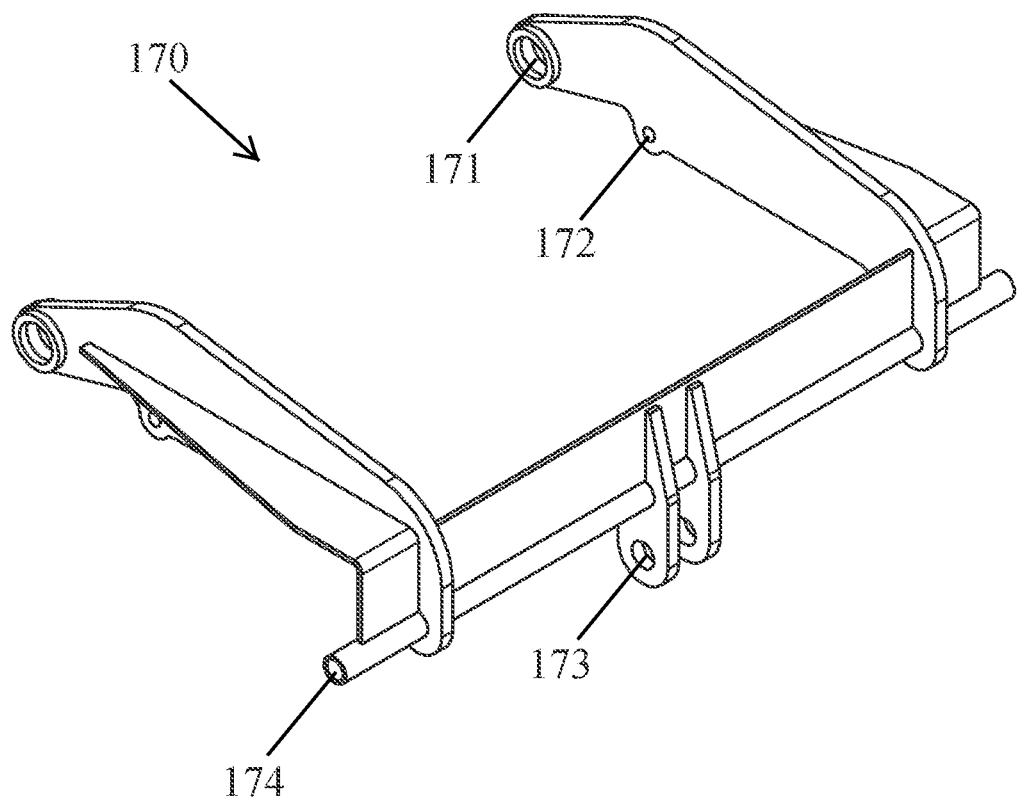
FIG. 7 is a perspective view of an exemplary top frame of a carrying tool in accordance with some embodiments of the present invention.
Figure 8:
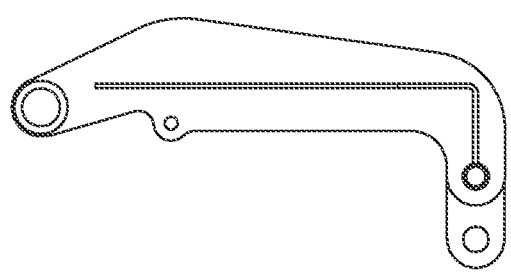
FIG. 8 is a side view of the top frame illustrated in FIG. 7.

As seen in FIGS. 7 and 8, top frame 170 may have one or more attachment points 171, 172, 173, and 174 for pivotally engaging assembly frame 130 at upper joint 132, cylinder rod 152 of hydraulic cylinder 150, hydraulic cylinder 160, and top link 180, respectively, and secured by one or more bolts or conventional fasteners. In some implementations, top frame 170 may have parallel aligned protrusions extending from a distal edge at attachment point 173. In some embodiments the top frame and the top link are pivotally engaged, however in some other embodiments, the top frame and the top link may be fixedly engaged or integrally formed.

Figure 9:
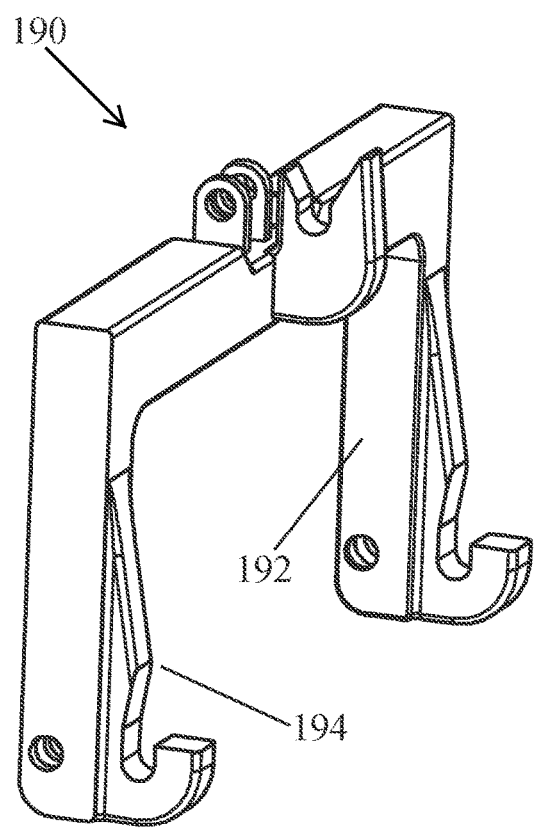
FIG. 9 is a perspective view of an exemplary linkage frame of a carrying tool in accordance with some embodiments of the present invention.
Figure 10:
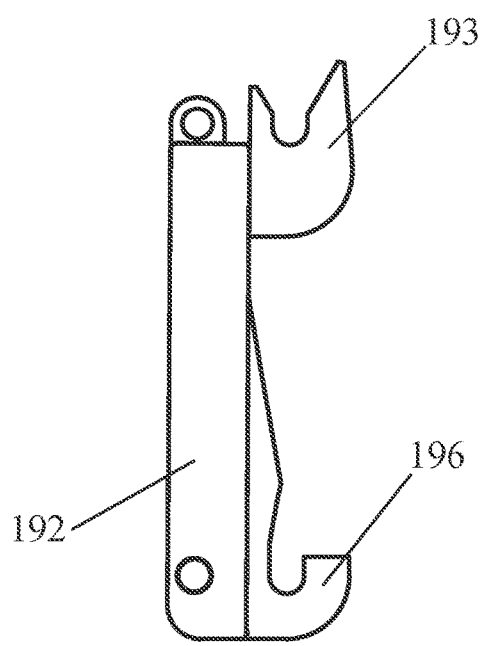
FIG. 10 is a side view of the linkage frame illustrated in FIG. 9.

Referring now to FIGS. 9 and 10, linkage frame 190 may have one or more brackets for the attachment of one or more implements. In a preferred embodiment, linkage frame 190 may have a first bracket 193 at a top portion thereof and one or more second brackets 194 at a lower portion of one or more legs 192. In some embodiments, each leg 192 of linkage frame 190 may have a bracket 194 which may abut and support a complementary portion of an attached implement. Advantageously, in some embodiments, second bracket 194 may have a shape that is similar to similar to mounting bracket 218 of toolbar 205, including upward protrusions 196. In such embodiments, it is to be appreciated that the carrying tool of the present invention can easily be inserted between a conventional implement and a conventional or improved mounting assembly for added functionality.

Referring back to the illustrations of FIGS. 1 and 2, in some embodiments of the present invention, carrying tool 100 may include two sets of hydraulic cylinders (see, e.g., FIGS. 1 and 2). A forward set (nearest a tractor or mounting assembly) may comprise lift cylinders 150 and a rear set may comprise suspension cylinders 160. When implements are attached to linkage frame 190 of carrying tool 100, suspension cylinders 160 may work to absorb shock and maintain the positions of top frame 170 and side links 140, relative to each other. Lift cylinders 150 may work to adjust the position of top frame 170, relative to assembly frame 130, by extending or retracting lift cylinder rod 152. In certain embodiments, suspension cylinders 160 may operate with one or more hydraulic accumulators. Use of hydraulic accumulators can reduce and minimize shock, providing for smoother operation of the carrying tool. Accumulators may also help with maintaining a constant pressure within the suspension cylinders, even if the power supply to a suspension cylinder were to be temporarily cut off. Therefore, in certain circumstances, it may be advantageous to use hydraulic accumulators to increase performance of and reduce stress on the tool, while minimizing the risk of damage in the case of a malfunction.

In some embodiments of the present invention, a carrying tool may have different configurations. In some implementations, instead of a suspension cylinder, a carrying tool can include a support extension engaged with the mounting assembly, a support extension cylinder between the support extension and the side link, and a support rod between the top frame and the side link. Referring now to the illustration of FIG. 17, and particularly pointing out variations in some embodiments with respect to the carrying tool of the present invention described above, carrying tool 300 may include support extensions 323, support extension cylinders 326, top frame 370, support rods 329, and side links 340. Support extensions 323 may be engaged to an assembly frame of carrying tool 300 at upper joints and lower joints (analogous to upper joints 132 and lower joints 134 of mounting assembly 130 as shown in FIG. 3). In contrast to side link 140 illustrated in FIG. 5 with medial attachment point 142 for engagement with suspension cylinder 160, side link 340 illustrated in FIG. 17 may have medial attachment points for engaging support extension cylinder 326 and support rod 329. Support extension cylinder 326 can be engaged with and between support extension 323 and side link 340. Support rod 329 can be engaged with and between top link 370 and side link 340. It is to be appreciated that a carrying tool may include any number, type, and combination of hydraulic cylinders, support rods, and support extensions, and configurations thereof, in accordance with embodiments of the present invention.

Improved Toolbar Mounting Assembly

In preferred embodiments, and as illustrated in FIGS. 11-14, an improved tractor mounting assembly 200 may include a toolbar 205, a tractor mounting portion 206, and one or more hydraulic toolbar cylinders 203. Mounting portion 206 may be fixedly engaged with a rear portion of a tractor. A pair of lateral upper arms 209 at a top side and a pair of lateral lower arms 208 at a bottom side may be (i) pivotally engaged on first ends with mounting portion 206 at a proximal end of mounting assembly 200 and (ii) pivotally engaged on second ends with toolbar 205 at a distal end of mounting assembly 200 (for purposes of this discussion, "proximal end" refers to the portion of the mounting assembly closest to the tractor to which the mounting assembly is engaged, "distal end" refers to the portion of the mounting assembly furthest from the tractor, "top side" refers to the portion of the mounting assembly furthest from the ground upon which the tractor sits, and "bottom side" refers to the portion of the mounting assembly closest to the ground). In some embodiments, and as illustrated in FIG. 11, mounting portion 206 may comprise separate subparts on lateral sides thereof. In some other embodiments, the mounting portion may be unitarily formed. Toolbar cylinders 203 may be pivotally engaged with lower arms 208 and upper arms 209 on either side of mounting assembly 200 at proximal and distal portions (with respect to a tractor) thereof, respectively. Toolbar 205 may be pivotally engaged with arms 208 and 209 at lower attachment openings 214 and upper attachment openings 216 on either side of mounting assembly 200, and may be secured by one or more bolts or other conventional fastening means. Toolbar 205 may include a central opening 212. In some implementations, central opening 212 can receive and engage a portion of a ripper assembly 400. When a carrying tool as described herein is engaged with toolbar 205, upper attachment openings 216 thereof may be aligned with toolbar attachment openings of the assembly frame (for example, and without limitation, attachment openings 137 of assembly frame 130 as illustrated in FIG. 3). Advantageously, the assembly frame of an improved carrying tool and the toolbar of the improved mounting assembly may each be secured to the upper arms of the improved mounting assembly. In some embodiments, mounting assembly 200 may include mounting brackets 218 on toolbar 205 with upwardly protruding edges located near the lower side edges thereof for engaging an agricultural implement. As discussed above, mounting brackets 218 may also be well suited for retaining lower protrusions of support brackets 136 of assembly frame 130 of carrying tool 100.

As illustrated in FIGS. 15A-C and 16A-C, and discussed more fully below, toolbar cylinders 203 of the improved mounting assembly may controllably adjust the height and rotation of toolbar 205 and a carrying tool (for example, and without limitation, carrying tool 100 or carrying tool 300). In some embodiments, a first end of toolbar cylinder 203 may be engaged to lower arm 208 at a point which is proximate to the point of engagement of lower arm 208 to mounting portion 206. In some embodiments, a second end of toolbar cylinder 203 may be engaged to upper arm 209 at a medial point thereon. In other embodiments, the second end of toolbar cylinder 203 may be engaged to upper arm 209 at a point which is distal to the point of engagement of upper arm 209 to mounting portion 206. It is to be appreciated that the engagement points of the toolbar cylinders to the upper and lower arms, as well as the relative lengths and spacing thereof, affect the range of motion of the toolbar relative to the point of attachment of the mounting portion to the tractor. In some embodiments, and as illustrated in FIG. 14, the upper arms and/or lower arms may have ridges or protrusions at the point of attachment of the toolbar cylinders.

Operation of a First Embodiment of a Carrying Tool

Figure 15A:
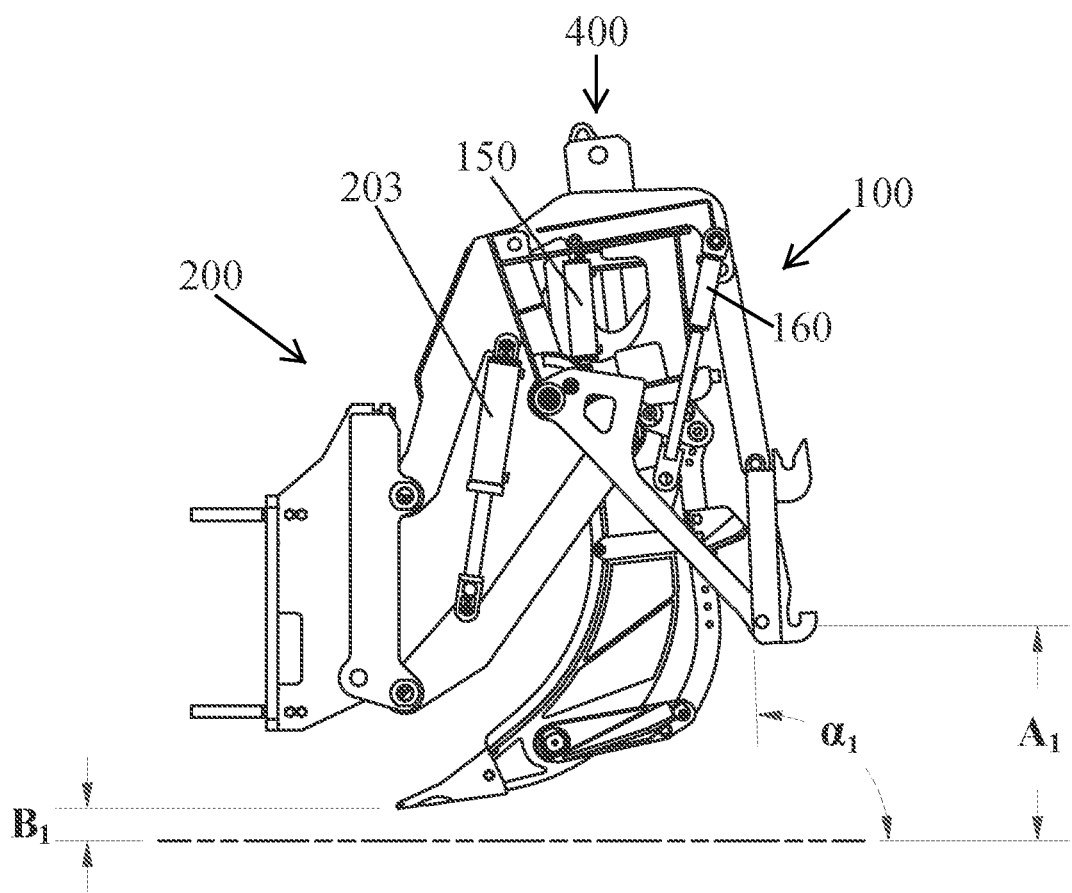
FIGS. 15A through 15C are side view diagrams illustrating how the toolbar cylinders and hydraulic cylinders orient, relative to the ground, a carrying tool in accordance with some embodiments of the invention.
Figure 15B:
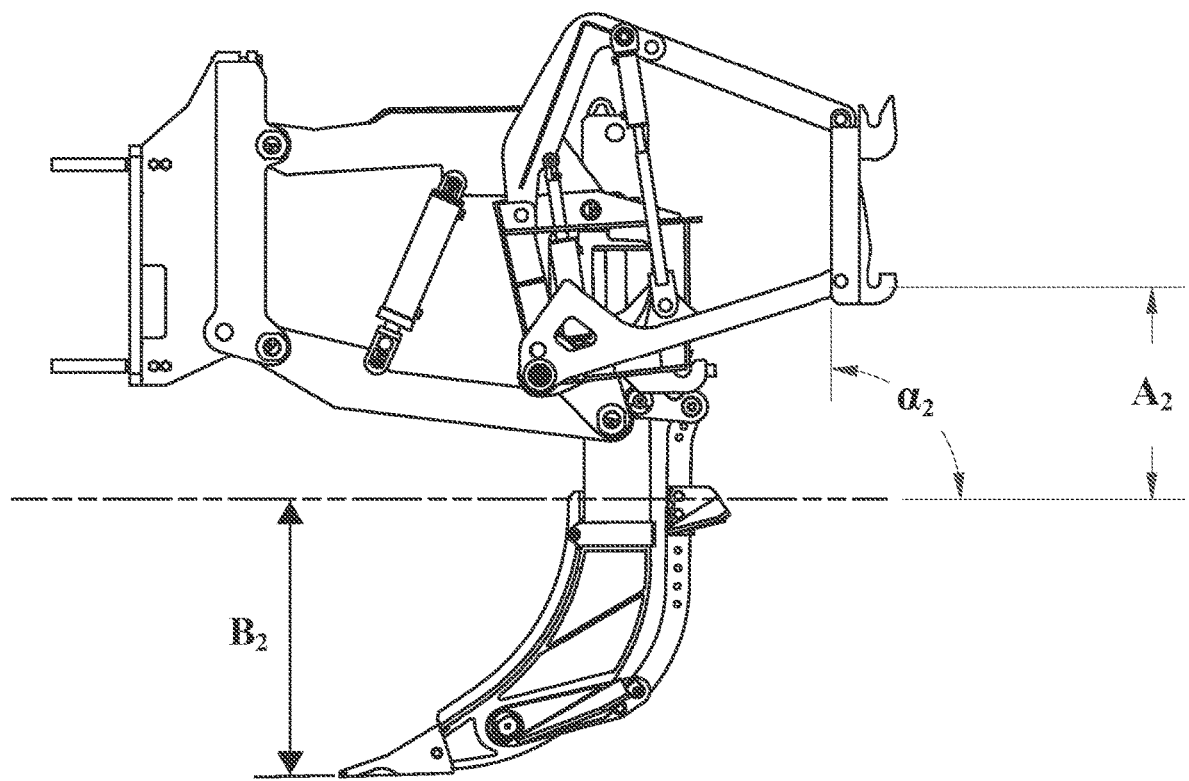
Figure 15C:
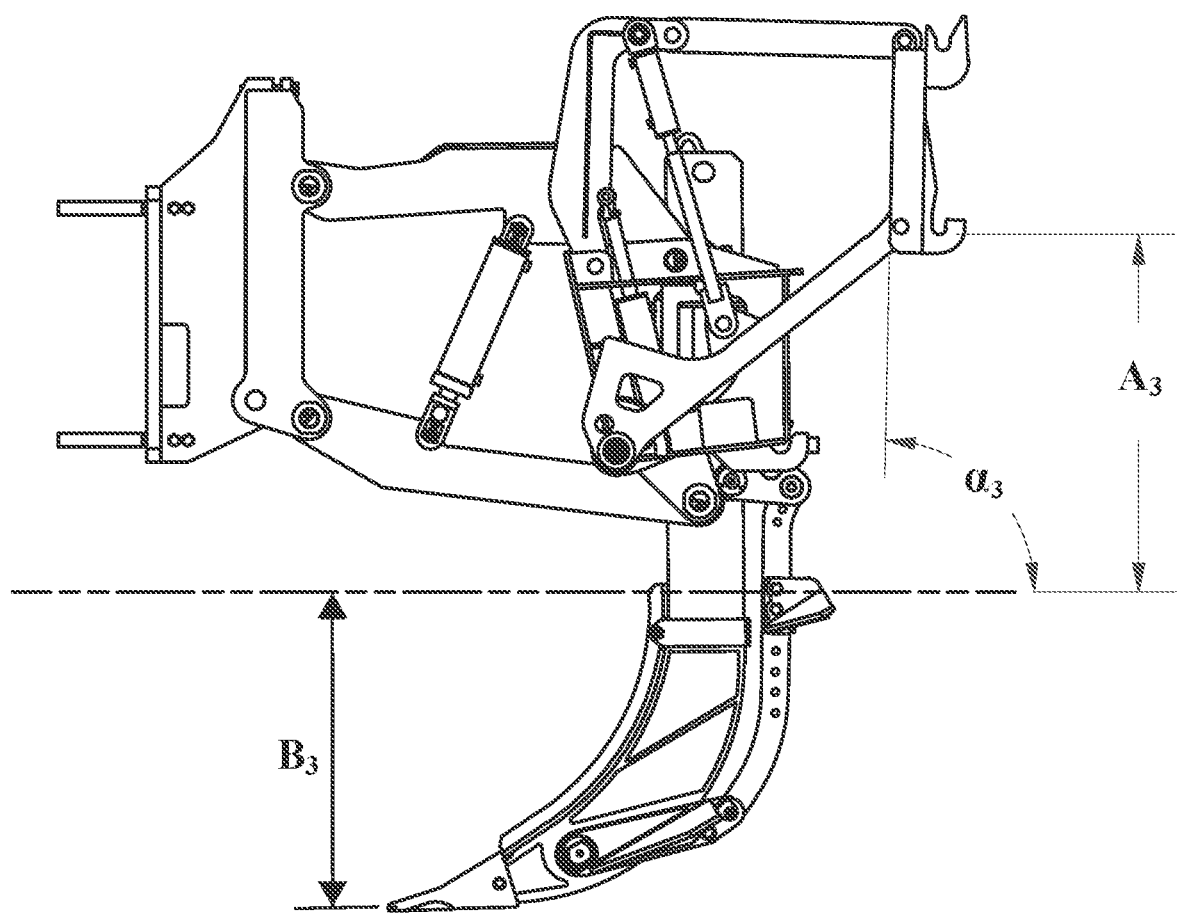

Operation of an improved carrying tool as illustrated in FIG. 2 mounted to an improved tractor mounting assembly is illustrated in FIGS. 15A-C. Carrying tool 100, having lift cylinders 150 and suspension cylinders 160 is engaged with mounting assembly 200 having toolbar cylinders 203. Ripper assembly 400 is engaged with the toolbar of mounting assembly 200. As illustrated in FIG. 15A, carrying tool 100 is in a lowered position and ripper assembly 400 is in a non-engaged position (i.e., not engaged with the soil). Toolbar cylinders 203 are in an extended position and lift cylinders 150 are in a retracted position. In this state, the lowermost point of ripper assembly 400 is above a reference level (e.g., ground surface) by distance $B_1$. The legs of the linkage frame are oriented at angle $\alpha_1$ and the protrusions of the second (lower) brackets are at distance $A_1$, relative to the reference level.

As illustrated in FIG. 15B, the carrying tool is in a partially raised position and the ripper assembly is in an engaged position (i.e., engaged in the soil). The toolbar cylinders are in a retracted position and the lift cylinders are in a partially extended position. In this state, the lowermost point of the ripper assembly is below the reference level by distance $B_2$. The legs of linkage frame are oriented at angle $\alpha_2$ and the protrusions of the second brackets are at distance $A_2$, relative to the reference level. In comparison to FIG. 15A, the linkage frame is at about the same height above the reference level (i.e., distance $A_2$ is approximately equal to the distance $A_1$), even though the toolbar and assembly frame have been lowered into the engaged position (e.g., distance $B_1$ is above the reference level whereas distance $B_2$ is below the reference level).

As illustrated in FIG. 15C, the carrying tool is in a maximally raised position and the ripper assembly is in an engaged position. The toolbar cylinders are in a retracted position and the lift cylinders are in a maximally extended position. In this state, the lowermost point of the ripper assembly is below the reference level by distance $B_3$. The legs of linkage frame are oriented at angle $\alpha_3$ and with the protrusions of the second brackets at distance $A_3$, relative to the reference level. In comparison to FIG. 15B, the linkage frame is higher above the reference level (i.e., distance $A_3$ is greater than the distance $A_2$), even though the toolbar and assembly frame remain in the engaged position (e.g., distance $B_3$ is approximately equal to distance $B_2$). Furthermore, it is to be appreciated that angle $\alpha_2$ and angle $\alpha_3$ are about the same, i.e., while the linkage frame is raised (FIG. 15C relative to FIG. 15B), the linkage frame maintains a near constant orientation relative to the reference level.

Operation of a Second Embodiment of a Carrying Tool

Figure 16A:
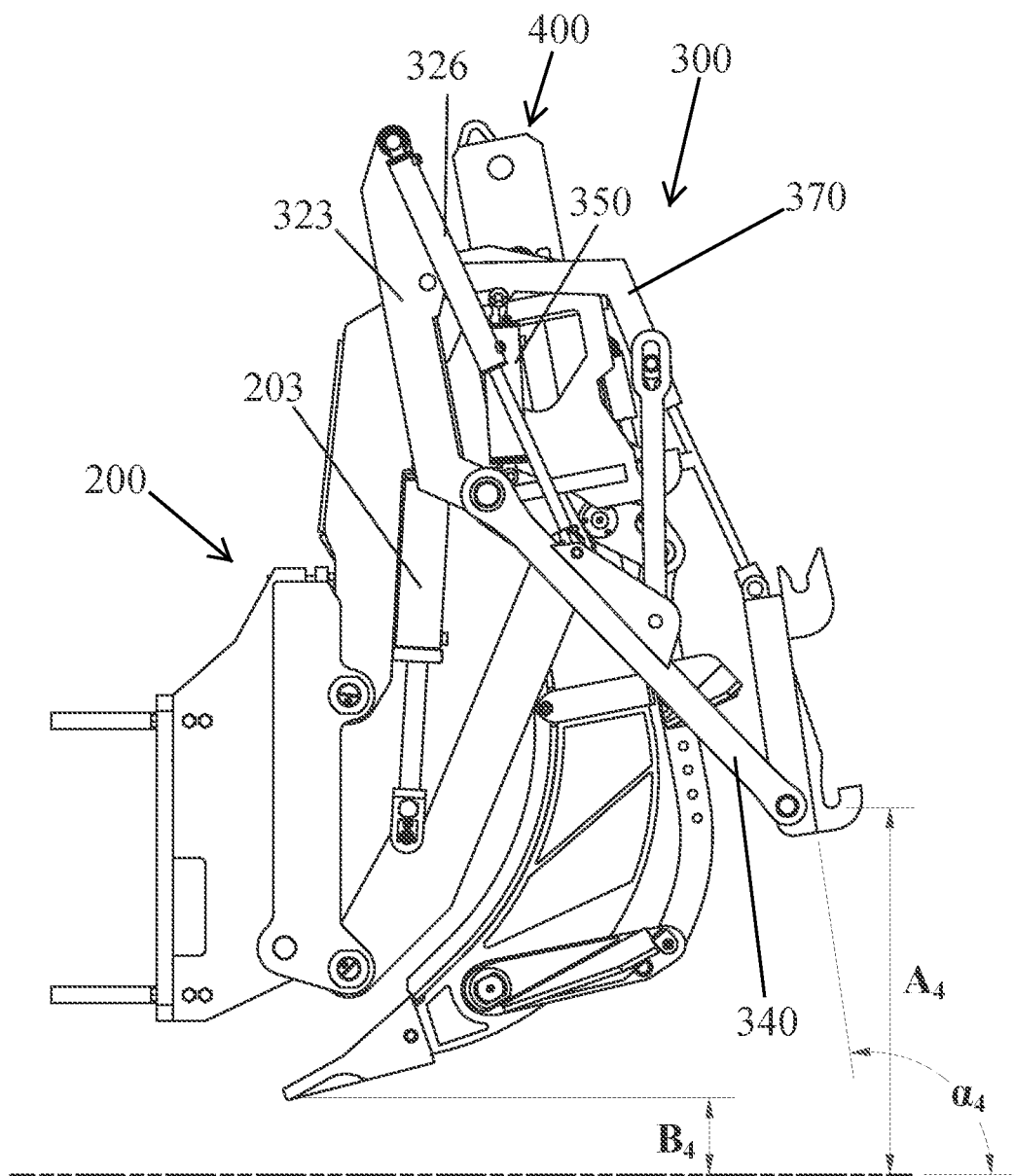
FIGS. 16A through 16C are side view diagrams illustrating how the toolbar cylinders and hydraulic cylinders orient, relative to the ground, a carrying tool in accordance with some embodiments of the invention.
Figure 16B:
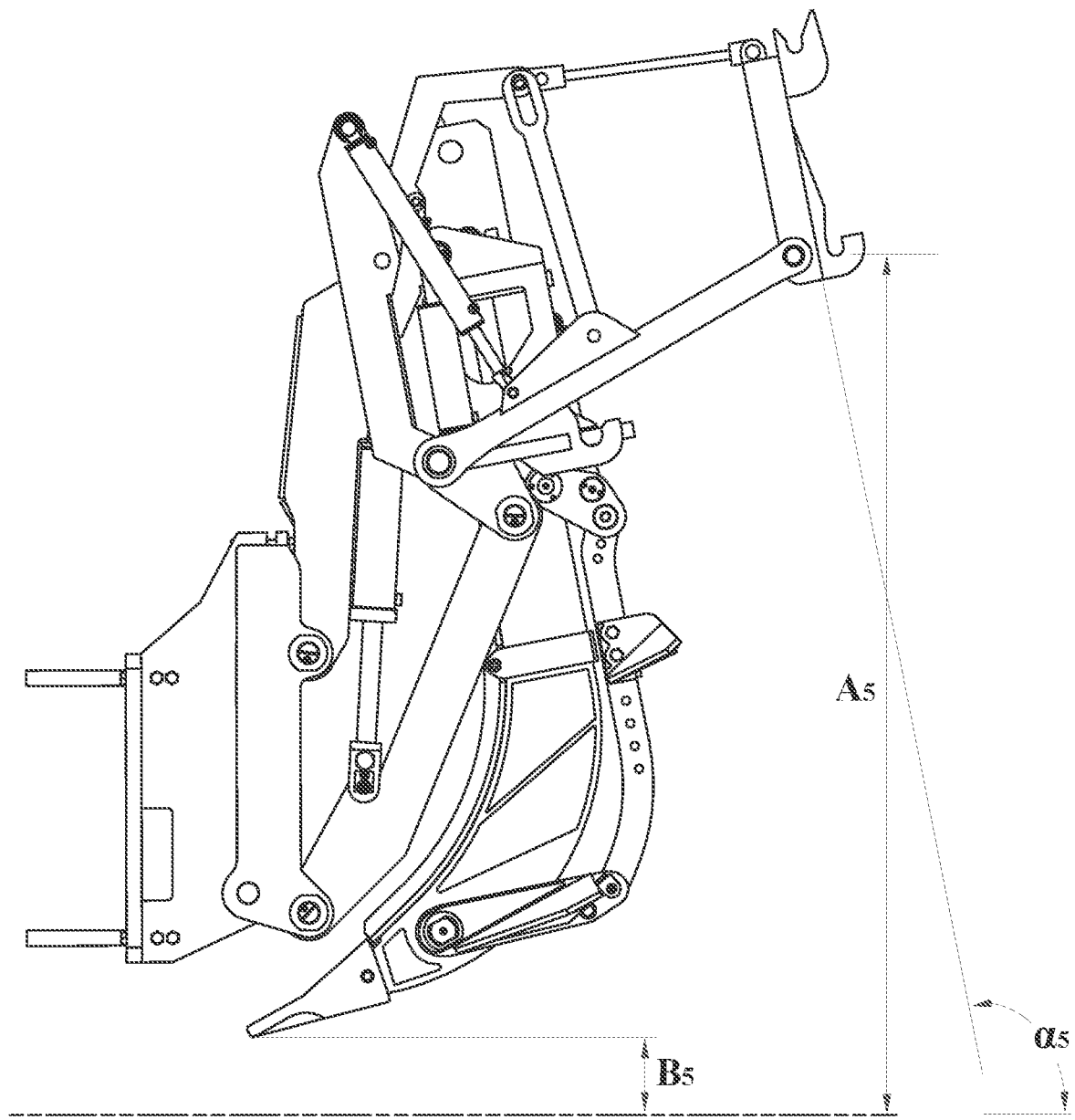
Figure 16C:
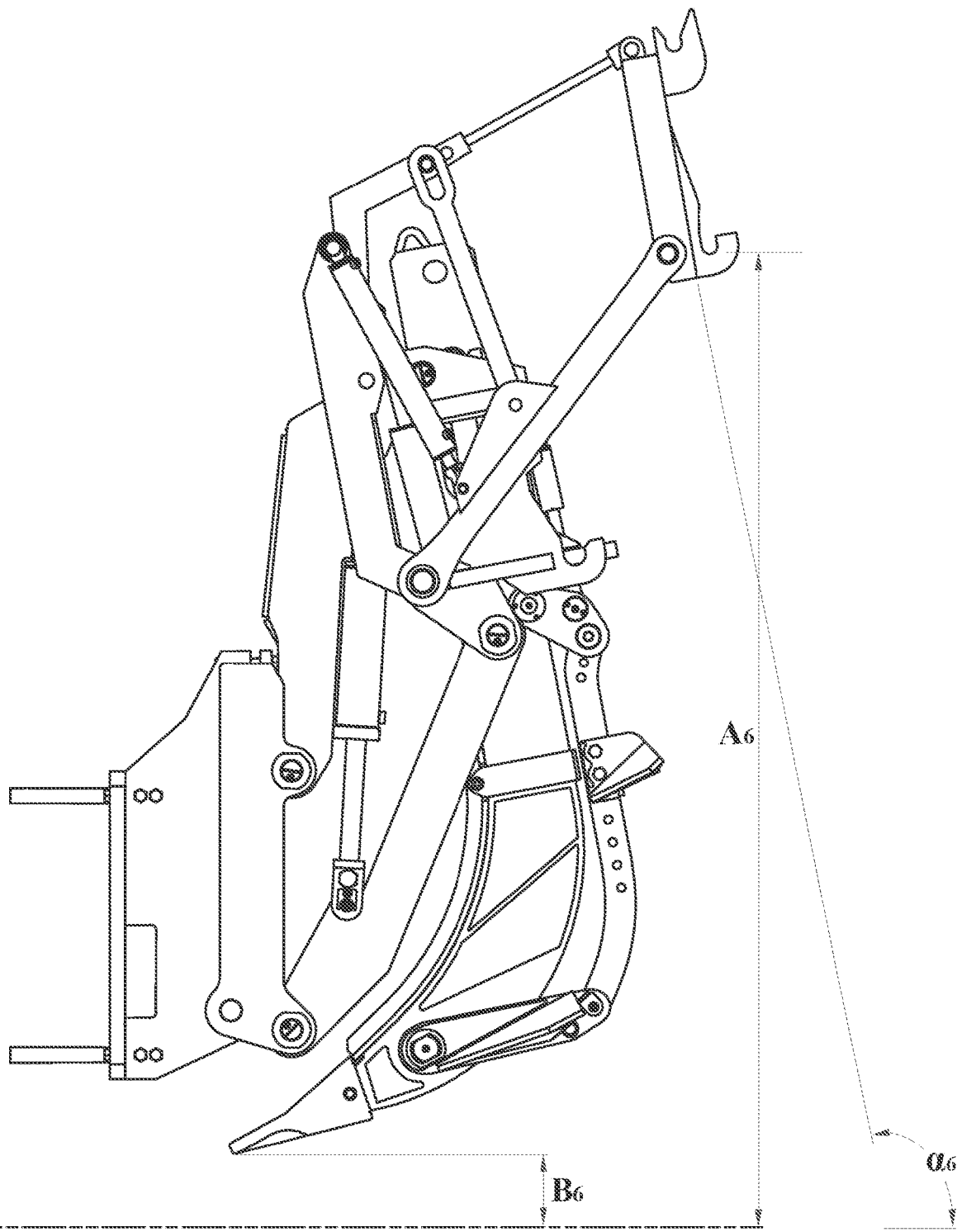
Figure 17:
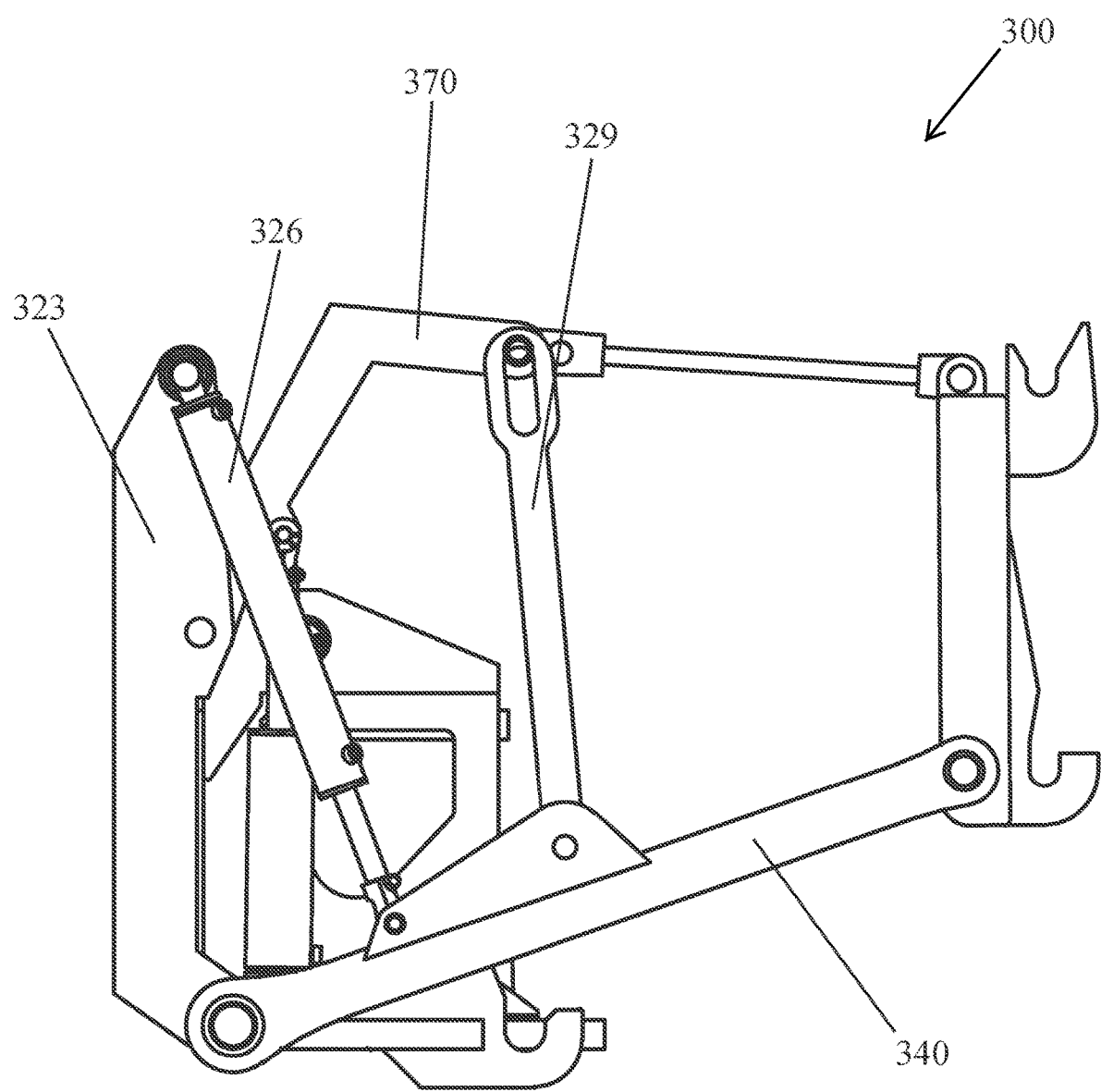
FIG. 17 is a side view diagram of a carrying tool in accordance with some embodiments of the present invention.

Operation of an improved carrying tool as illustrated in FIG. 17 mounted to an improved tractor mounting assembly is illustrated in FIGS. 16A-16C. Carrying tool 300, having lift cylinders 350, support extensions 323, support extension cylinders 326, top frame 370, and side links 340 is engaged with mounting assembly 200 having toolbar cylinders 203. Ripper assembly 400 is engaged with the toolbar of mounting assembly 200. As illustrated in FIG. 16A, carrying tool 300 is in a lowered position and ripper assembly 400 is in a non-engaged position (i.e., not engaged with the soil). Toolbar cylinders 203 are in an extended position, support extension cylinders 326 are in a maximally extended position, and lift cylinders 350 are in retracted position. In this state, the lowermost point of ripper assembly 400 is above a reference level (e.g., ground surface) by distance $B_4$. The legs of the linkage frame are oriented at angle $\alpha_4$ and the protrusions of the second (lower) brackets are at a distance $A_4$, relative to the reference level.

As illustrated in FIG. 16B, the carrying tool is in a raised position and the ripper assembly is in a non-engaged position. The toolbar cylinders are in an extended position, the support extension cylinders are in an extended position, and the lift cylinders are in an extended position. In this state, the lowermost point of the ripper assembly is above the reference level by distance $B_5$. The legs of the linkage frame are oriented at angle $\alpha_5$ and the protrusions of the second brackets are at a distance $A_5$, relative to the reference level. In comparison to FIG. 16A, the linkage frame is higher relative to the reference level (i.e., distance $A_5$ is greater than distance $A_4$), even though the angle relative to the reference level is the about the same (e.g., angle $\alpha_5$ and angle $\alpha_4$ are about the same) and the ripper assembly is about the same distance from the reference level (i.e., distance $B_5$ and distance $B_4$ are about the same).

As illustrated in FIG. 16C, the carrying tool is in a maximally raised position and the ripper assembly is in a non-engaged position. The toolbar cylinders are in an extended position, the support extension cylinders are in a retracted position, and the lift cylinders are in a maximally extended position. In this state, the lowermost point of the ripper assembly is above the reference level by distance $B_6$. The legs of the linkage frame are oriented at angle $\alpha_6$ and the protrusions of the second brackets are at a distance $A_6$, relative to the reference level. In comparison to FIG. 16B, the linkage frame is higher relative to the reference level (i.e., distance $A_6$ is greater than distance $A_5$), even though the angle relative to the reference level is the about the same (e.g., angle $\alpha_6$ and angle $\alpha_5$ are about the same) and the ripper assembly is about the same distance from the reference level (i.e., distance $B_6$ and distance $B_5$ are about the same).

It is to be appreciated that compared with carrying tool 200 illustrated in FIGS. 15A-15C, carrying tool 300 illustrated in FIGS. 16A-16C can significantly extend the height above a common reference (e.g. ground surface) thus enabling a greater range of height adjustments of an implement engaged to the carrying tool relative to the ground.

In some aspects, the present invention provides improvements to a tractor mounting assembly having a toolbar for engaging one or more tools to a tractor, such as the ripper assembly disclosed in the '444 Application or the '486 Application. In some aspects, the present invention provides a carrying tool for engaging one or more tools or implements, such as the rollers illustrated FIG. 1 of the '401 Patent, to a toolbar of a tractor mounting assembly. It is to be appreciated, however, that while some embodiments of the present invention include an improved tractor mounting assembly and a carrying tool, the invention is not limited to embodiments containing both the improved tractor mounting assembly and a carrying tool. For example, a system in accordance with some embodiments of the present invention may include the improved tractor mounting assembly and no carrying tool. In other examples, a system in accordance with some embodiments of the present invention may include a carrying tool with the tractor mounting assembly as illustrated in the '401 Patent, the '444 Application or the '486 Application.

It is to be understood that variations, modifications, and permutations of embodiments of the present invention may be made without departing from the scope thereof. It is also to be understood that the present invention is not limited by the specific embodiments, descriptions, or illustrations or combinations of either components or steps disclosed herein. Thus, although reference has been made to the accompanying figures, it is to be appreciated that these figures are exemplary and are not meant to limit the scope of the invention.

What is claimed is:

1. A carrying tool for engaging an agricultural implement to a tractor comprising:
   a. an assembly frame adapted to engage a toolbar of said tractor;
   b. a first side link on a first lateral side of said carrying tool and a second side link on a second lateral side of said carrying tool, each said side link having a first end pivotally engaged with said assembly frame;
   c. a top frame pivotally engaged with said assembly frame;
   d. a top link engaged with said top frame;
   e. a linkage frame adapted to engage said agricultural implement, said linkage frame pivotally engaged with each said top frame, a second end of said first side link, and a second end of said second side link; and
   f. a first hydraulic lift cylinder engaged with said assembly frame and engaged with said top frame.

2. The carrying tool of claim 1, further comprising a second hydraulic lift cylinder engaged with said assembly frame and engaged with said top frame.

3. The carrying tool of claim 2, wherein said first hydraulic lift cylinder is on said first lateral side of said carrying tool and said second hydraulic lift cylinder is on said second lateral side of said carrying tool, each said hydraulic lift cylinder having a first end engaged with said assembly frame and a second end engaged with said top frame.

4. The carrying tool of claim 1, further comprising a first hydraulic suspension cylinder having a first end engaged with said top frame.

5. The carrying tool of claim 4, further comprising a second hydraulic suspension cylinder having a first end engaged with said top frame.

6. The carrying tool of claim 5, wherein said first hydraulic suspension cylinder is on said first lateral side of said carrying tool and said second hydraulic suspension cylinder is on said second lateral side of said carrying tool, said first hydraulic suspension cylinder having a second end engaged with said first side link and said second hydraulic suspension cylinder having a second end engaged with said second side link.

7. The carrying tool of claim 4, further comprising a hydraulic accumulator coupled with said first hydraulic suspension cylinder.

8. The carrying tool of claim 1, further comprising a first support rod having a first end engaged with said top frame.

9. The carrying tool of claim 8, further comprising a first support extension engaged to said assembly frame.

10. The carrying tool of claim 9, further comprising a first hydraulic extension cylinder having a first end engaged to said first support extension.

11. The carrying tool of claim 10, further comprising a second support rod having a first end engaged with said top frame, a second support extension engaged to said assembly frame, and a second hydraulic extension cylinder having a first end engaged to said second support extension.

12. The carrying tool of claim 11, wherein said first support rod has a second end engaged with said first side link and said first hydraulic extension cylinder has a second end engaged with said first side link, and wherein said second support rod has a second end engaged with said second side link and said second hydraulic extension cylinder has a second end engaged with said second side link.

13. The carrying tool of claim 12, wherein said first support extension and said second support extension are unitarily formed.

14. The carrying tool of claim 1, wherein said top link is integrally formed with said top frame.

15. The carrying tool of claim 1, wherein said assembly frame further comprises at least one support bracket having a shape adapted for engaging with a complementary bracket of said toolbar of said tractor.

16. The carrying tool of claim 15, wherein said linkage frame further comprises at least one bracket having a shape adapted for engaging said agricultural implement.

17. The carrying tool of claim 16, wherein said bracket of said toolbar of said tractor has a shape adapted for engaging said agricultural implement.

\* \* \* \* \*